US008914420B2

(12) United States Patent
Purohit (10) Patent No.: US 8,914,420 B2
(45) Date of Patent: Dec. 16, 2014

(54) POPULATING DATA STRUCTURES OF SOFTWARE APPLICATIONS WITH INPUT DATA PROVIDED ACCORDING TO EXTENSIBLE MARKUP LANGUAGE (XML)

(75) Inventor: Sibasis Purohit, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 310 days.

(21) Appl. No.: 13/459,272

(22) Filed: Apr. 30, 2012

(65) Prior Publication Data
US 2013/0290377 A1    Oct. 31, 2013

(51) Int. Cl.
G06F 17/30    (2006.01)
G06F 7/00    (2006.01)

(52) U.S. Cl.
USPC ........................... 707/803; 707/756; 707/791

(58) Field of Classification Search
None
See application file for complete search history.

(56) References Cited

U.S. PATENT DOCUMENTS

| | | | |
|---|---|---|---|
| 7,548,946 B1 | 6/2009 | Saulpaugh et al. | |
| 7,882,149 B2 | 2/2011 | Foster et al. | |
| 8,082,491 B1 | 12/2011 | Abdelaziz et al. | |
| 2002/0087571 A1* | 7/2002 | Stapel et al. | 707/100 |
| 2003/0110177 A1* | 6/2003 | Andrei et al. | 707/100 |
| 2005/0177578 A1* | 8/2005 | Chen et al. | 707/100 |
| 2005/0228800 A1* | 10/2005 | Dettinger et al. | 707/100 |
| 2005/0289457 A1* | 12/2005 | Obasanjo et al. | 715/513 |
| 2006/0253465 A1* | 11/2006 | Willis et al. | 707/100 |
| 2009/0112901 A1 | 4/2009 | Friedman | |
| 2010/0131520 A1* | 5/2010 | Weinberg et al. | 707/756 |
| 2010/0220348 A1 | 9/2010 | Matsushima | |
| 2011/0225114 A1* | 9/2011 | Gotthardt | 706/50 |

OTHER PUBLICATIONS

"RomXML®", http://www.allegrosoft.com/romxml.html, Downloaded Circa Dec. 27, 2011, p. 1.
Robert Van Engelen, "An XML Web Services Development Environment for Embedded Devices", http://www.cs.fsu.edu/~engelen/cases03.html , File translated from TEX by TTH, version 3.39, Dated Jun. 19, 2003, p. 1-14.

\* cited by examiner

*Primary Examiner* — Dung K Chau
(74) *Attorney, Agent, or Firm* — Narendra Reddy Thappeta (57) ABSTRACT

An aspect of the present invention populates data structures of a software application with input data provided according to XML. In one embodiment, the input data and a schema is received, with the schema containing another set of data structures according to the programming language in which the software application is written. The input data is parsed according to the schema to identify elements and corresponding values. The identified values are then stored in the fields of the data structures of the application. According to another aspect, the schema received with the input data specifies a mapping of each of the elements in the input data to corresponding fields of data structures of a software application. Accordingly, the specified fields of the data structures are set to the values associated with the corresponding mapped elements in the input data.

15 Claims, 6 Drawing Sheets

```
301: <?xml Version="1.0"?>
302: <datarecord>
303:    <field1>23</field1>
304:    <customer premier="true">
305:       <name>
306:          <firstname>Robert</firstname>
307:          <lastname>Jones</lastname>
308:       </name>
309:    </customer>
310:    <switch>192.23.45.67</switch>
311:    <counter index="1">8</counter>
312:    <counter index="2">9</counter>
313:    <counter index="3">0</counter>
314: </datarecord>
```

*FIG. 3A*

```
351: typedef struct {
352:    UINT8 Field1;
353:    Cust sCust;
354:    UINT8 *SwitchAddress;
355:    counter Counter[3];
356: } myRecord;

357: typedef struct {
358:    CustName sName;
359:    UINT8 Premier;
360: } Cust;

361: typedef struct {
362:    xml_str_t FirstName;
363:    xml_str_t LastName;
364: } CustName;

365: typedef struct {
366:    UINT8 index;
367:    UINT8 value;
368: } counter;
```

*FIG. 3B*

```
401: xml_obj_t DataRec = { { "datarecord",
402:                         XML_COMPLEX_ELEMENT,      /* xml_obj_type_t objType */
403:                         XML_DT_NONE,              /* xml_data_type_t dataType */
404:                         1,                        /* UINT8 maxObjOcc */
405:                         0 }                       /* UINT16 offset */
406:                         { 4,                      /* UINT8 maxNumOfObj */
407:                         sizeof (myRecord),        /* UINT16 size */
408:                         {&fild1, &cust, &switch, &cnt } } };  /* xml_obj_t *pObj[ ] */

409: xml_obj_t fild1 = {     "field1",                 /* UINT8 *pName */
410:                         XML_SIMPLE_ELEMENT,       /* xml_obj_type_t objType */
411:                         XML_DT_UINT8,             /* xml_data_type_t dataType */
412:                         1,                        /* UINT8 maxObjOcc */
413:                         offsetof (myRecord, Field1) };   /* UINT16 offset */

414: xml_obj_t cust = { { "customer",                  /* UINT8 *pName */
415:                      XML_COMPLEX_ELEMENT,         /* xml_obj_type_t objType */
416:                      XML_DT_NONE,                 /* xml_data_type_t dataType */
417:                      5,                           /* UINT8 maxObjOcc */
418:                      offsetof (myRecord, sCust) } /* UINT16 offset */
419:                    { 2,                           /* UINT8 maxNumOfObj */
420:                      sizeof (Cust),               /* UINT16 size */
421:                      {&premier, &custName} } };   /* xml_obj_t *pObj[ ] */

422: xml_obj_t premier = { "premier",                  /* UINT8 *pName */
423:                       XML_ATTRIBUTE,              /* xml_obj_type_t objType */
424:                       XML_DT_BOOL,                /* xml_data_type_t dataType */
425:                       1,                          /* UINT8 maxObjOcc */
426:                       offsetof (Cust, Premier) }; /* UINT16 offset */
```

*FIG. 4*

```
501: myRecord myrec = {
502:     23,                      /* UINT8 Field1 */
503:     {                        /* Cust sCust */
504:         {                    /* CustName sName */
505:             "Robert",        /* xml_str_t FirstName */
506:             "Jones"          /* xml_str_t LastName */
507:         },
508:         1                    /* UINT8 Premier (1 indicating true)*/
509:     },
510:     "192.23.45.67",          /* UINT8 *SwitchAddress */
511:     {                        /* counter Counter[3] */
512:         { 1, 8 },            /* UINT8 index, UINT8 value */
513:         { 2, 9 },            /* UINT8 index, UINT8 value */
514:         ( 3, 0 )             /* UINT8 index, UINT8 value */
515:     }
516: };
```

POPULATING DATA STRUCTURES OF SOFTWARE APPLICATIONS WITH INPUT DATA PROVIDED ACCORDING TO EXTENSIBLE MARKUP LANGUAGE (XML)

BACKGROUND

1. Technical Field

Embodiments of the present disclosure relate generally to software based digital processing systems, and more specifically to populating data structures of programming languages with input data provided according to eXtensible Markup Language (XML).

2. Related Art

Data structures are fundamental to development of software applications using high level programming languages. Each data structure typically contains one or more fields, grouped as felt suitable by a developer. As such, the data structure provides a level of abstraction to data, that facilitates developers to model closer to the entities (e.g., sales order, people, etc.) to which the software applications are directed. A developer can thereafter conveniently write software instructions (according to the same programming language) based on such data structures.

Data structures often need to be populated with input data for appropriate operation of software application. Input data refers to data received from external to the software application (e.g., from a user or other software applications), contrasted with data generated as a result of operation of the software application. Populating a data structure generally entails associating the corresponding values to respective fields defined (by a developer) in the data structure.

There are often situations when input data is provided according to XML format. There is accordingly a requirement that the data structures of programming languages be populated with input data provided according to XML.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

An aspect of the present invention populates data structures of a software application with input data provided according to XML. In one embodiment, the input data and a schema is received, with the schema containing another set of data structures according to the programming language in which the software application is written. The input data is parsed according to the schema to identify elements and corresponding values. The identified values are then stored in the fields of the data structures of the application.

According to another aspect of the present invention, a schema received with an input data according to XML, specifies a mapping of each of the elements in the input data to corresponding fields of data structures of a software application. Accordingly, the specified fields of the data structures are set to the values associated with the corresponding mapped elements in the input data.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1A:
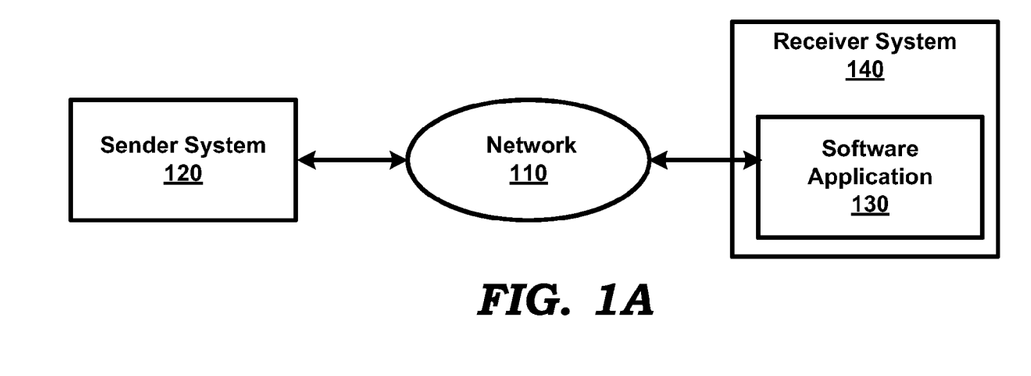
FIG. 1A shows an example environment (computing system) in which several aspects of the present invention can be implemented.

FIG. 1A shows an example environment (computing system) in which several aspects of the present invention can be implemented. The example environment is shown containing network 110, sender system 120 and receiver system 140 (in turn shown containing software application 130).

Merely for illustration, only representative number/type of systems is shown in FIG. 1A. Many environments often contain many more systems, both in number and type, depending on the purpose for which the environment is designed. Each system of FIG. 1A is described below in further detail.

Network 110 provides connectivity between sender system 120 and receiver 140 and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 110.

Sender system 120 represents a system such as a personal computer, workstation, mobile station, etc., used by users to send data (e.g., configuration data, requests for performing desired tasks, etc.) to other (receiver) systems such as 140. The users may send the data using appropriate user interfaces provided by the computing system. Some of the data may be directed to software application 130 executing in receiver system 140.

Receiver system 140 represents a system executing applications capable of receiving and processing (input) data sent from other systems such as sender system 120. Software application 130 shown executing in computing system 140 represents one such application capable of receiving and processing input data. As noted in the Background section, there are several scenarios where input data may be provided according to XML format.

As is well known, XML (eXtensible Markup Language) refers to a specification used for describing characteristics of information/data. The desired characteristics are specified in the form of tags, each tag containing a corresponding text between the angled brackets "<" and ">". The information may be organized as simple elements (containing corresponding start and end tags), complex elements containing other simple elements and attributes (specified between the angled brackets) associated with corresponding values.

Software application 130 may be correspondingly designed to receive and process XML input data as described below with examples.

3. Example Software Application

Figure 1B:
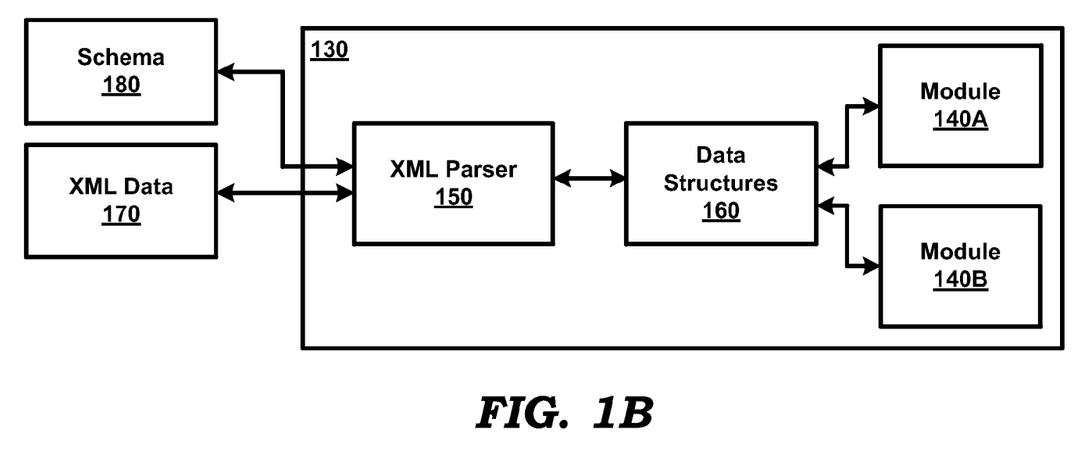
FIG. 1B shows an example implementation of a software application designed to receive and process input data according to XML format in one embodiment.

FIG. 1B shows an example implementation of a software application (130) designed to receive and process input data according to XML format in one embodiment. In particular, software application 130 is shown containing modules 140A-140B, XML parser 150, and data structures 160. The modules, parser and data structures may be written according to any programming language such as C, C++, Java™, etc.

Each of modules 140A-140B represents a portion of software application 130 that provides a pre-defined interface (of the inputs and outputs) for operation with other modules. For example, the pre-defined interface of modules 140A-140B may require that some of the inputs and/or outputs be provided in the form of data structures 160. As noted above, data structures 160 contains fields, which are to be set to corresponding values of XML (input) data 170 for the operation of modules 140A-140B.

XML parser 150 represents an executable module designed to convert non-XML data stored in data structures 160 into corresponding portions of XML data 170 (referred to as "encoding") and also converts XML data 170 into corresponding non-XML data in data structures 160 (referred to as "decoding"). Encoding entails adding specific tags to values of the fields in data structures 160, while decoding entails setting the values of the fields to corresponding values. Encoding and decoding may also entail converting between the data types specified for the values in the XML and non-XML format. XML parser 150 may accordingly perform such encoding and decoding according to a structure of the XML, specified internal to the parser or received from an external source.

Schema 180 represents external data (typically, provided in the form of a file) that specifies the structure of XML data 170. In particular, schema 180 specifies the tags which are required/optional, the data type of the values associated with the tags, and the hierarchy of the tags (the child tags that can be contained in a tag), etc. of XML data 170. XML parser 150 is accordingly designed to encode/decode data between data structures 160 and XML data 170 using the structure of the XML specified in schema 180.

In one prior approach, schema 180 is also specified according to XML. Further detail on such a format (referred to as "XML-Schema") is provided at "http://www.w3.org/TR/2004/REC-xmlschema-0-20041028/". XML parser 150 may be accordingly designed to parse the XML data forming schema 180 (according to a pre-defined structure stored internal to XML parser 150), determine the specific structure of XML data 170 and then decode XML data 170 into data structures 160 based on the determined structure.

It may be appreciated that the prior approach to decoding has the disadvantage of requiring additional resources (such as CPU time, memory, etc.) for processing multiple XML structures (schema and data). Such additional resources may not be available in resource constrained systems such as embedded systems. As is well known, an embedded system is specifically designed for a task and accordingly includes hardware elements that are focused towards performance of the task. As such, the embedded system may not have sufficient additional resources required for performing the prior approach noted above. It may accordingly be desirable that the decoding of XML data into non-XML format be facilitated even in such resource constrained systems.

XML parser 150, modified/extended according to several aspects of the present invention, populates data structures (160) of software applications (130) with input data provided according to XML (170), as described below with examples.

4. Populating Data Structures

Figure 2:
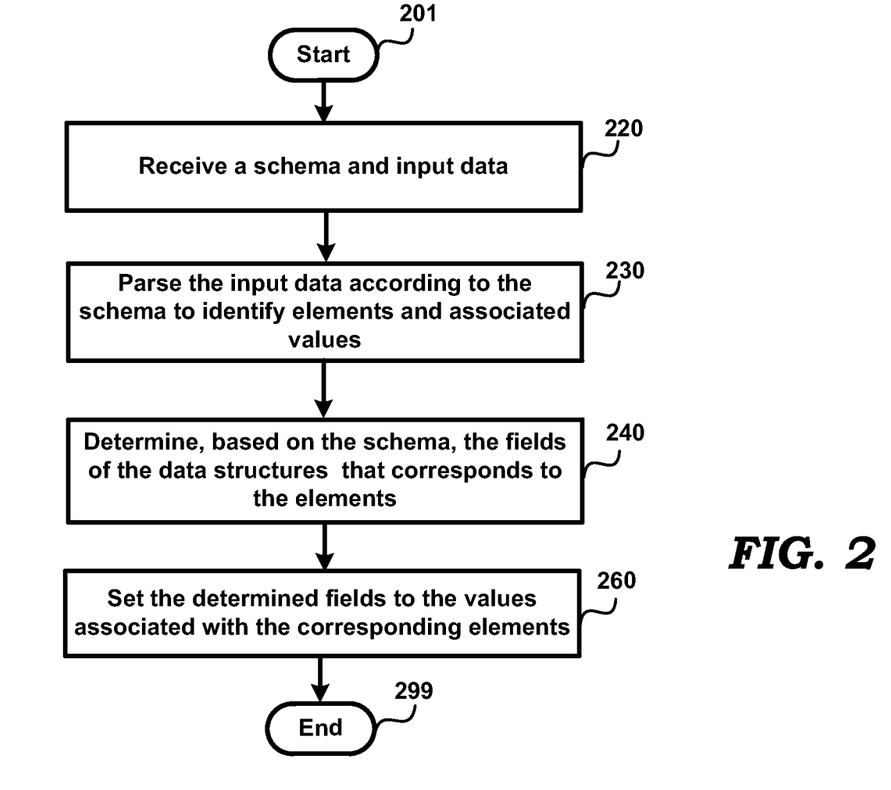
FIG. 2 is a flowchart illustrating the manner in which data structures of software applications are populated with input data provided according to XML according to an aspect of the present invention.

FIG. 2 is a flowchart illustrating the manner in which data structures of software applications are populated with input data provided according to XML according to an aspect of the present invention. The flowchart is described with respect to FIGS. 1A and 1B merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, XML parser 150 receives a schema (180) and input data (170) according to XML. The schema and input data may be received from sender system 120. The schema (180) is specified according to the programming language in which a software application (such as 130) is written, implying that the schema is provided consistent with the syntax/semantics of the programming language. XML parser 150 is designed to load the schema directly into memory and thereafter use the loaded schema to process the XML input data as described in detail below.

In step 230, XML parser 150 parses the input data according to schema to identify elements and associated values. The parsing may entail inspecting the characters in the input data to identify tags (text between angled brackets) and elements (start and end tags) as specified in the schema and then determining based on the identified tags/elements, the corresponding values specified in the input data.

In step 240, XML parser 150 determines, based on the schema, the fields of the data structures (160) that corresponds to the elements (in the input data). The schema may accordingly specify for each element in the XML input data, the corresponding field in the data structures sought to be populated.

In step 260, XML parser 150 sets the determined fields to the value(s) associated with the corresponding elements (as identified in step 230), thereby populating the data structures (160) of the software application (130) with the XML input data 170. The flow chart ends in step 299.

Thus, by providing a schema according to the programming language of the software application and loading the schema directly into memory, the overhead of parsing a schema data/file (in particular, an XML based schema) is avoided. Accordingly, the technique of FIG. 2 can be implemented even in resource constrained systems such as embedded systems.

The manner in which XML parser 150 performs the steps of FIG. 2 in one embodiment is described below with examples.

5. Illustrative Example

FIGS. 3A-3B, 4 and 5 together illustrate the manner in which XML parser 150 populates data structures (160) of a software application (130) with input data according to XML (170) in one embodiment. Each of the Figures is described in detail below.

Figure 3A:
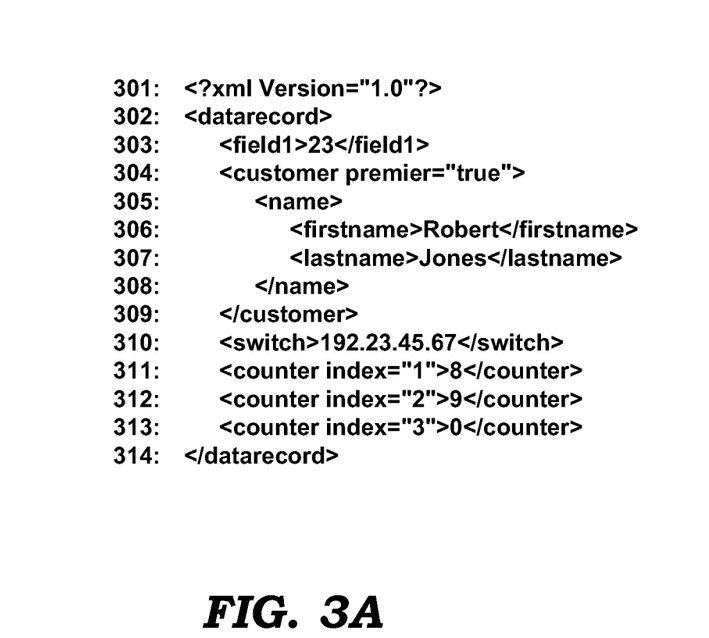
FIG. 3A depicts an input data according to XML in one embodiment.

FIG. 3A depicts an input data (170) according to XML in one embodiment. Line 301 indicates that the data is specified according to XML. Lines 302-314 specify a complex element named "datarecord" (as indicated by the start tag "<datarecord>" and end tag "</datarecord>") containing other elements such as "field1", "customer", etc. Line 303 specifies a simple element named "Field1" associated with the value "23", while lines 304-309 specifies the details of the complex element "customer". Line 304 indicates that the element "customer" has an attribute named "premier" having the associated value "true". Similarly, other lines specify corresponding elements, attributes and values in the input data.

Figure 3B:
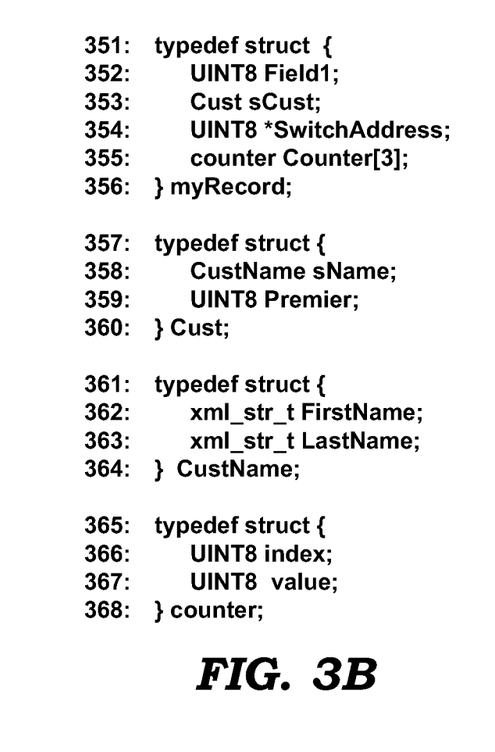
FIG. 3B depicts data structures of a software application sought to be populated in one embodiment.

FIG. 3B depicts data structures (160) of a software application (130) sought to be populated in one embodiment. The description is continued assuming that the software application (and as such the data structures) is written according to C programming language. However, the features of the present invention can be implemented in the context of other programming languages as well, as will apparent to one skilled in relevant art by reading the disclosure herein.

Thus, lines 351-356, 357-360, 361-364 and 365-368 specify corresponding data structures named "myRecord", "Cust", "CustName" and "counter" specified in the C programming language. Each data structure is shown containing corresponding fields, each field having a corresponding name (such as "Field1", "FirstName", "index", etc.) and an associated data type (such as UINT8, xml_str_t, etc.). Also some of the data structures (such as myRecord, and Cust) are shown referring to another data structures (such as Cust in line 353 and CustName in line 358).

It should be noted that a developer of the software application may specify any convenient set of data structures corresponding to the XML input data sought to be processed. The developer may also specify the schema according to the same programming language as described below with examples.

6. Schema According to Programming Language of Software Application

Figure 4:
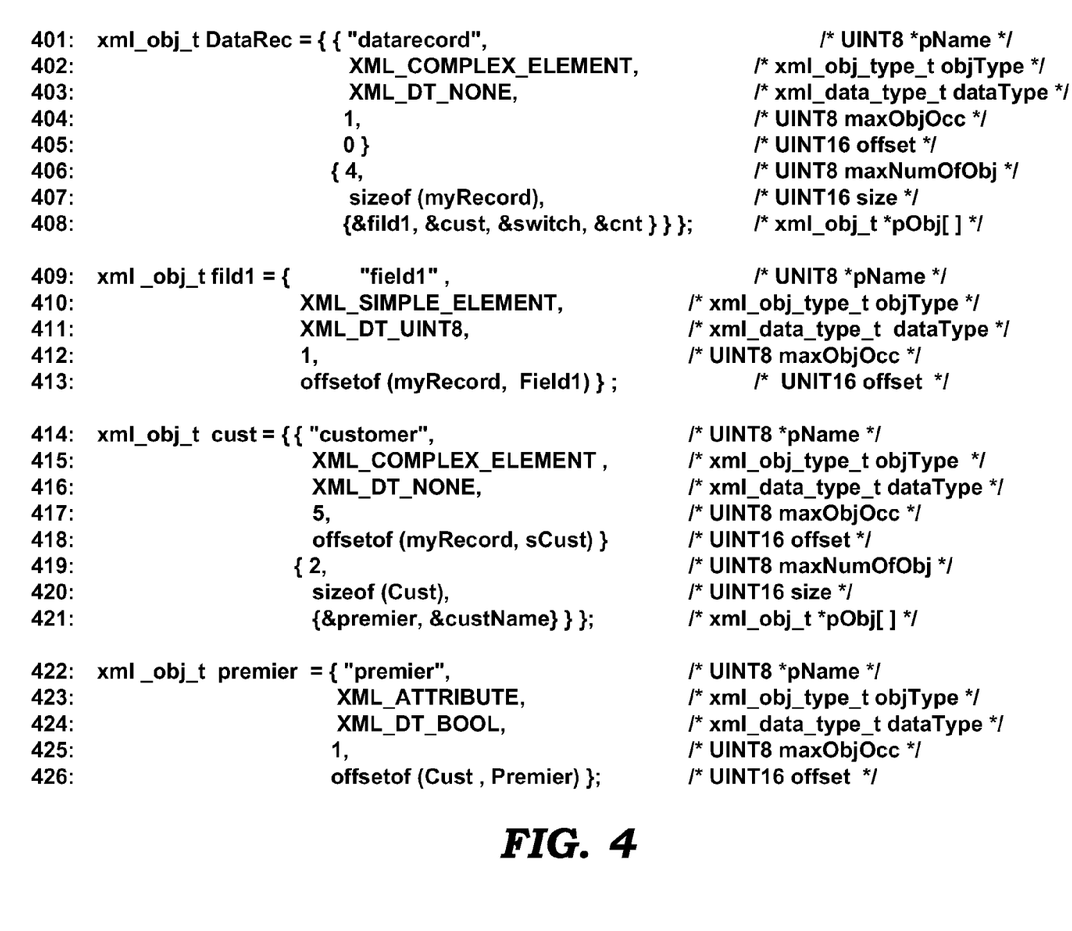
FIG. 4 depicts portions of a schema used to decode XML input data and populate data structures of a software application in one embodiment.

FIG. 4 depicts portions of a schema (180) used to decode XML input data (170) and populate data structures (160) of a software application in one embodiment. The schema is specified in the form of one or more data structures (hereafter referred to as "schema structures") according to the C programming language. Broadly, the schema structures specify the respective texts and hierarchy of the tags that may be included in the XML input data. In addition, the schema structures also specify a mapping of each of the elements of the XML data 170 to respective fields of the data structures (160) in the software application.

Only a representative set of schema structures are shown in FIG. 4. The general structure of the schema is shown in further detail in section titled "A1. Data Structures used to represent any XML Schema" of Appendix A, while all the schema structures corresponding to the schema (and accordingly required for parsing the data) of FIG. 3A is shown in section titled "A2. Sample XML Schema using data structures of A1" of Appendix A.

Referring to FIG. 4, lines 401-408 defines a schema structure named "DataRec" corresponding to the top level/root element of the XML input data, and which is used as the starting point by XML parser 150 when processing the schema. Line 410 indicates that the value "datarecord" represents the text of the tag corresponding to the root element. In other words, the root element is represented in the XML by the start tag "<datarecord>" and the end tag "</datarecord>". Similarly, in each of the schema structure, the value of the variable "*pName" indicates the text of respective tags specified in the XML.

Lines 402-404 respectively indicate that the element "datarecord" is a complex element (containing other elements), does not contain any data (value "XML_DT_NONE") and can occur only once in the XML input data 170. Lines 406-408 respectively indicate that the complex element "datarecord" contains 4 elements, the size of the 4 elements as being the size of myRecord data structure (shown in lines 351-356) and the schema structures (fild1, cust, switch, cnt) corresponding to the 4 elements.

In lines 409-413, the schema structure named "fild1" indicates that a simple element (line 410) specified using the tag "field1" (line 409) occurs only once (line 412) and contains an small integer (UINT8) value (line 411) that is to be stored in the field named "Field1" of the myRecord data structure (line 413). Similarly, in lines 414-421, the schema structure named "cust" specifies the details of a complex element named "customer", while in lines 422-426, the schema structure named "premier" specifies the details of an attribute (as indicated by line 423) named "premier".

It may be appreciated that the indication of fild1 and cust as sub-structures of DataRec in line 408 specifies that the corresponding "Field1" and "Customer" elements are sub-elements of the "datarecord" element. Similarly, the indication of the schema structure "premier" in line 421 specifies that the corresponding attribute "premier" is an attribute of the "Customer" element.

Similarly, by specifying appropriate schema structures and corresponding sub-structures, any desired schema of the XML data may be represented using data structures specified according to the programming language of the software applications.

It may be appreciated that the schema of FIG. 4 specifies a mapping between the elements (and attributes) of the XML input data and corresponding fields in the data structures 160 (specified by a developer), with XML parser 150 populating the fields with the values associated with the mapped elements.

Such a feature is in contrast to prior approaches (such as when schema is specified according to XML) where the data structures (160) are dynamically generated by XML parser 150 in response to parsing of the input data (with modules 140A-140B designed to operate with the dynamically generated structures). As such, by providing a mapping as part of schema 180, the resource overhead of XML parser 150 is further reduced.

The manner in which XML parser 150 processes the XML input data based on the schema structures is described below with examples.

7. Processing XML Input Data

XML parser 150 receives the schema structures of FIG. 4 (and Appendix A2) along with the input data of FIG. 3A sought to be processed. In one embodiment, the schema is received once prior to receiving of any input data and stored in a non-volatile storage by XML parser 150. In response to receiving input data noted above (and/or other similar input data), XML parser 150 retrieves and uses the stored schema to parse the different input data.

In response to receiving the input data, XML parser 150 first loads into memory all the schema structures (either received along with the input data or after retrieving from the non-volatile storage). XML parser 150 then checks for the "DataRec" schema structure and use the corresponding information to identify the root element "datarecord" of the XML data.

In response to identifying that the root element is a complex element (line 402), XML parser 150 further inspects the sub-structures and determines whether any of the corresponding elements (specified by the sub-structures) are present in the input data. On identifying that schema structure (for example, field1) indicates a corresponding value (line 411), XML parser 150 identifies the text ("23") between the start tag and end tag ("<Field1>" and "</Field1>") as the value corresponding to the element (step 230). XML parser 150 further determines the corresponding field in the data structure (Field1 of myRecord) corresponding to the element and then sets the field to the identified value ("23").

XML parser 150 may similarly perform the above noted operations for other elements and/or attributes specified in the schema structures. It is noted that for attributes, the values are identified as the text specified between the double quotes after the "=" symbol according to XML convention. The manner in which the data structures of the software application may be populated with the input data is described below with examples.

Figure 5:
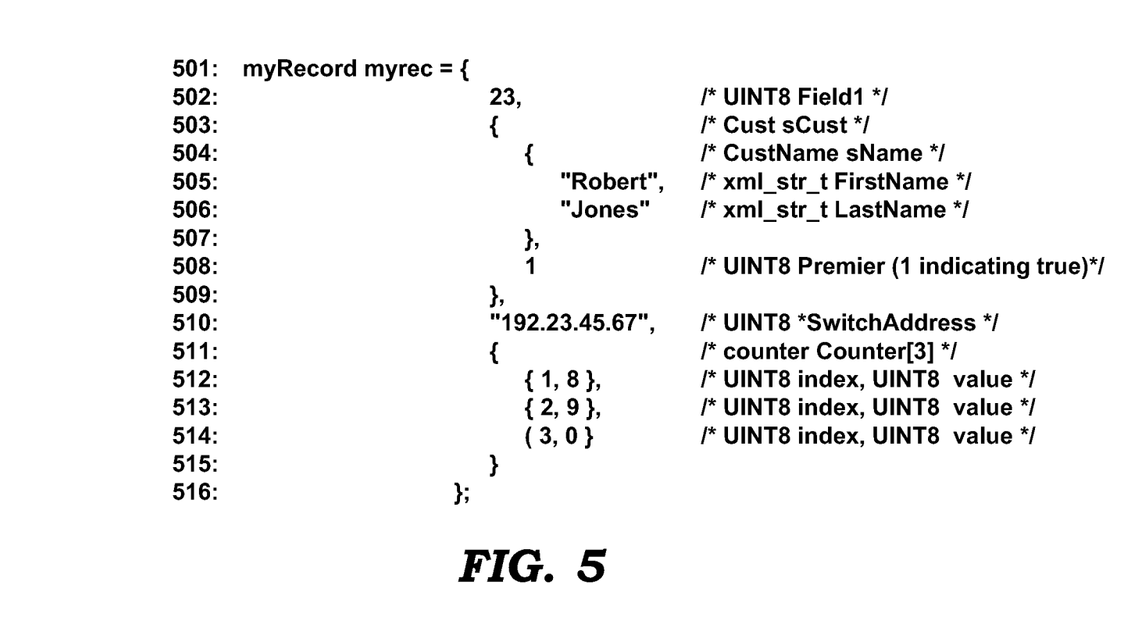
FIG. 5 depicts data structures of a software application populated with values from XML input data in one embodiment.

FIG. 5 depicts data structures (160) of a software application (130) populated with values from XML input data (170) in one embodiment. In particular, lines 501-516 depict the data structures of FIG. 3B populated with corresponding values from the input data of FIG. 3A. Each of the lines is shown containing a value and comment (in the form of "/* ... */") indicating the specific field for which the value is set.

For example, the value "23" in line 502 is set for the field "Field1" corresponding to the mapping shown in line 413 of FIG. 4 and the value of "23" associated with the element "Field1". Similarly, other lines indicate corresponding values populated in the data structures according to the mappings in the schema structures and values associated with the elements in the input data.

Thus, XML parser 150 populates data structures of software applications with input data provided according to XML. It may be appreciated that though XML parser 150 is shown within software application 130, in alternative embodiments, XML parser 150 may be provided external to (and shared by) multiple software applications executing in receiver system 140. XML parser 150 may be accordingly implemented using the same programming language as the software applications.

It should be further appreciated that the features described above can be implemented in various embodiments as a desired combination of one or more of hardware, executable modules, and firmware. The description is continued with respect to an embodiment in which various features are operative when executable modules are executed.

8. Exemplary System

Figure 6:
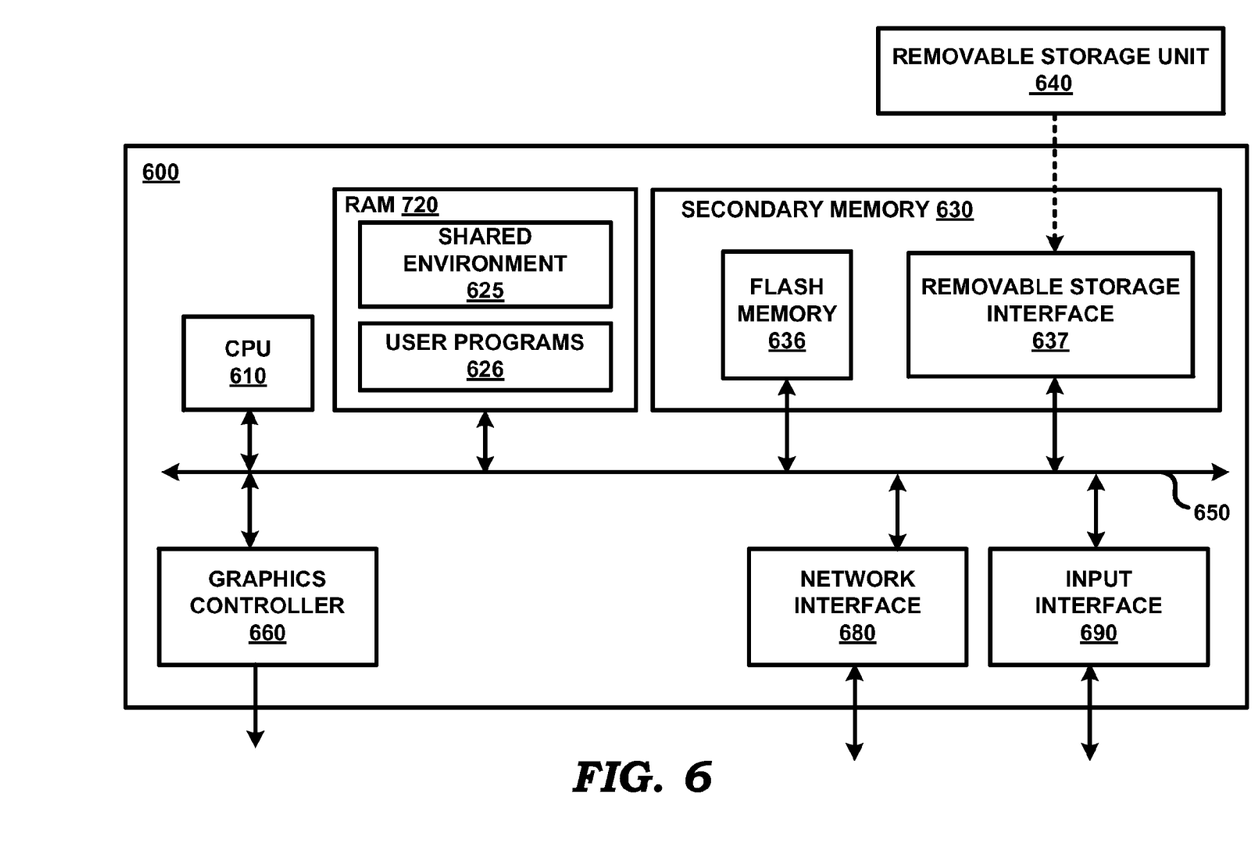
FIG. 6 is a block diagram illustrating the details of a digital processing system in which various aspects of the present invention are operative by execution of appropriate executable modules.

FIG. 6 is a block diagram illustrating the details of digital processing system 600 in which various aspects of the present invention are operative by execution of appropriate executable modules. Digital processing system 600 may correspond to any system (such as receiver system 140) executing XML parser 150.

Digital processing system 600 may contain one or more processors (such as a central processing unit (CPU) 610), random access memory (RAM) 620, secondary memory 530, graphics controller 660, network interface 680, and input interface 690. All the components may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing executable modules constituting shared environment 625 and/or user programs 626. Shared environment 625 contains utilities shared by user programs, and such shared utilities include operating system, device drivers, virtual machines, flow engine, etc., which provide a (common) run time environment for execution of user programs/applications.

Graphics controller 660 generates display signals (e.g., in RGB format) to external display unit(s) based on data/instructions received from CPU 610. The external display unit(s) may then display images defined by the display signals. Input interface 690 receives the user inputs required for several aspects of the present invention. The user inputs may be provided using input devices such as a keyboard and a pointing device (e.g., touch-pad, mouse). Network interface 680 provides connectivity to a network (e.g., using Internet Protocol), and may be used to communicate with other connected systems (such as sender systems 120) of FIG. 1.

Secondary memory 630 (representing a non-transitory storage/medium) may contain flash memory 636, and removable storage interface 637. Secondary memory 630 may store the data (for example, portions of schema structures of FIG. 4, populated data structures of FIG. 5, etc.) and software instructions (for example, for performing the steps of FIG. 2), which enable digital processing system 600 to provide several features in accordance with the present invention. Some or all of the data and instructions may be provided on removable storage unit 640, and the data and instructions may be read and provided by removable storage interface 637 to CPU 610.

Removable storage unit 640 may be implemented using medium and storage format compatible with removable storage interface 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

APPENDIX A

A1. Data Structures used to represent any XML Schema

Each XML object is represented in C structure as below:

```
typedef struct xml_obj_t {
    UINT8 *pName;                /** Text of the tag/attribute with '/0' Termination */
    xml_obj_type_t objType;      /** Object/Element type */
    xml_data_type_t dataType;    /** Data/value type */
    UINT8 maxObjOcc;             /** Maximum occurrence of the object.
                                     If it is not known then user can fill as 255 */
    UINT16 OFFSET;               /** Offset of the object from the starting
                                     address of its parent structure */
} xml_obj_t;
```

For the complex element the object structure definition would be defined as given below:

```
typedef struct xml_obj_complex_t {
    xml_obj_t obj;
    xml_complex_info_t complex;
} xml_obj_complex_t;
```

Where the xml_complex_info_t is defined as below:

```
typedef struct xml_complex_info_t {
    UINT8 maxNumOfObj;           /** Maximum number of objects
                                     the complex element has */
    UINT16 size;                 /** Structure size of the complex element */
    xml_obj_t *pObj[ ];          /** Pointer to the child elements it contains*/
} xml_complex_info_t;
```

And xml_obj_type_t and xml_data_type_t are defined as below:

```
enum xml_obj_type_t {
    XML_COMPLEX_ELEMENT,
    XML_SIMPLE_ELEMENT,
    XML_ATTRIBUTE
}
enum xml_data_type_t {
    XML_DT_NONE,
    XML_DT_UINT8,
    XML_DT_INT8,
    XML_DT_UINT16,
    XML_DT_INT16;
    XML_DT_UINT32,
    XML_DT_INT32,
    XML_DT_UINT64,
    XML_DT_INT64,
    XML_DT_FLOT,
    XML_DT_DBL,
    XML_DT_STR
    XML_DT_TOKEN,
    XML_DT_BASE64BIN,
    XML_DT_HEXBIN,
    XML_DT_DATE,
    XML_DT_TIME,
    XML_DT_DATE_TIME,
    XML_DT_DURATION
}
```

APPENDIX A-continued

A2. Sample XML Schema using data structures of A1

```
xml_obj_t DataRec = {{
        "datarecord",              /* UINT8 *pName */
        XML_COMPLEX_ELEMENT,       /* xml_obj_type_t objType */
        XML_DT_NONE,               /* xml_data_type_t dataType */
        1,                         /* UINT8 maxObjOcc */
        0                          /* UINT16 offset */
    }{
        4,                         /* UINT8 maxNumOfObj */
        sizeof (myRecord),         /* UINT16 size */
        {&fild1, &cust, &switch, &cnt}   /* xml_obj_t *pObj[ ] */
    } };
xml_obj_t fild1 = {
        "field1",                  /* UNIT8 *pName */
        XML_SIMPLE_ELEMENT,        /* xml_obj_type_t objType */
        XML_DT_UINT8,              /* xml_data_type_t dataType */
        1,                         /* UINT8 maxObjOcc */
        offsetof (myRecord, Field1)   /* UNIT16 offset */
    };
xml_obj_t cust = {{
        "customer",                /* UINT8 *pName */
        XML_COMPLEX_ELEMENT ,      /* xml_obj_type_t objType */
        XML_DT_NONE,               /* xml_data_type_t dataType */
        5,                         /* UINT8 maxObjOcc */
        offsetof (myRecord, sCust) /* UINT16 offset */
    }{
        2,                         /* UINT8 maxNumOfObj */
        sizeof (Cust),             /* UINT16 size */
        {&premier, &custName}      /* xml_obj_t *pObj[ ] */
    } };
xml_obj_t premier = {
        "premier",                 /* UINT8 *pName */
        XML_ATTRIBUTE,             /* xml_obj_type_t objType */
        XML_DT_BOOL,               /* xml_data_type_t dataType */
        1,                         /* UINT8 maxObjOcc */
        offsetof (Cust , Premier)  /* UINT16 offset */
    };
xml_obj_t custName = {{
        "name",                    /* UINT8 *pName */
        XML_COMPLEX_ELEMENT,       /* xml_obj_type_t objType */
        XML_DT_NONE,               /* xml_data_type_t dataType */
        5,                         /* UINT8 maxObjOcc */
        offsetof (Cust, sName)     /* UINT16 offset */
    }{
        2,                         /* UINT8 maxNumOfObj */
        sizeof (CustName),         /* UINT16 size */
        {&fName, & lName }         /* xml_obj_t *pObj[ ] */
    }};
xml_obj_t fName = {
        "firstname",               /* UNIT8 *pName */
        XML_SIMPLE_ELEMENT,        /* xml_obj_type_t objType */
        XML_DT_STR,                /* xml_data_type_t dataType */
        1,                         /* UINT8 maxObjOcc */
        offsetof (Cust Name, FirstName)   /* UNIT16 offset */
    };
xml_obj_t lName = {
        "lastname",                /* UNIT8 *pName */
        XML_SIMPLE_ELEMENT,        /* xml_obj_type_t objType */
        XML_DT_STR,                /* xml_data_type_t dataType */
        1,                         /* UINT8 maxObjOcc */
        offsetof (Cust Name, LastName)   /* UNIT16 offset */
    };
xml_obj_t switch = {
        "switch",                  /* UNIT8 *pName */
        XML_SIMPLE_ELEMENT,        /* xml_obj_type_t objType */
        XML_DT_STR,                /* xml_data_type_t dataType */
        1,                         /* UINT8 maxObjOcc */
        offsetof (myRecord, SwitchAddress)   /* UNIT16 offset */
    };
xml_obj_t cnt = {{
        "counter",                 /* UINT8 *pName */
        XML_COMPLEX_ELEMENT,       /* xml_obj_type_t objType */
        XML_DT_UINT8,              /* xml_data_type_t dataType */
```

APPENDIX A-continued

```
    3,                              /* UINT8 maxObjOcc */
    offsetof (myRecord, Counter),   /* UINT16 offset */
}{
    1,                              /* UINT8 maxNumOfObj */
    sizeof (counter),               /* UINT16 size */
    {&idex }                        /* xml_obj_t *pObj[ ] */
}};
xml_obj_t idx = {
    "index",                        /* UNIT8 *pName */
    XML_ATTRIBUTE,                  /* xml_obj_type_t objType */
    XML_DT_UINT8,                   /* xml_data_type_t dataType */
    1,                              /* UINT8 maxObjOcc */
    offsetof (Counter, index)       /* UNIT16 offset */
};
```

What is claimed is:

1. A method of populating a plurality of data structures of a software application written in a programming language, each of said plurality of data structures containing corresponding fields, said method comprising:

receiving an input data, said input data being according to eXtensible Markup Language (XML), wherein said input data contains a plurality of elements, each element having an associated value;

receiving a non-XML based schema, said non-XML based schema containing a plurality of schema structures according to said programming language of said software application, said plurality of schema structures specifying a mapping of each of said plurality of elements to respective fields of said plurality of data structures; and setting each of the fields of said plurality of data structures to values associated with an element specified by said mapping, wherein said plurality of data structures contains a first data structure containing a first field, wherein said plurality of schema structures contains a first schema structure and a second schema structure, said first schema structure contains a mapping of a first tag text to said first data structure, said second schema structure contains a mapping of a second tag text to said first field, said first schema structure containing a link to said second schema structure to indicate that elements having said second tag text are disposed within elements having said first tag text, wherein said setting comprises:

parsing said plurality of elements to identify a hierarchical element having said first tag text and a sub-element at a lower level, said sub-element being disposed within said hierarchical element and having said second tag text, said sub-element having a first value; and storing said first value in said first field of said first data structure, in response to said identifying.

2. The method of claim 1, wherein each of said plurality of schema structures contains a type field indicating data type of the field into which the corresponding value is to be stored, wherein said type field in said first schema structure indicates that there is no value to be stored corresponding to the first schema structure, wherein said type field in said second schema structure indicates a first data type of said first field, wherein said parsing identifies a text between a start tag and an end tag, both of said start tag and said end tag containing said second tag text, wherein said storing further comprising converting said text into said first value of said first data type specified by said second schema structure.

3. The method of claim 1, wherein a third schema structure of said plurality of schema structures specifies a mapping of a first attribute text of an element in said plurality of elements to a second field in a second data structure of said plurality of data structures, wherein said parsing identifies a third value associated with said first attribute text in said element of said input data, wherein said storing stores said third value in said second field of said second data structure.

4. The method of claim 3, wherein said third schema structure is pointed to by a fourth schema structure of said plurality of schema structures, said fourth schema structure corresponding to said element.

5. The method of claim 1, wherein said first schema structure specifies a number of sub-elements in said hierarchical element, said first schema structure containing a number of links equaling said number of sub-elements, each link pointing to a corresponding one of a third set of schema structures of said plurality of schema structures, said third set of schema structures corresponding to sub-elements contained in said hierarchical element.

6. A non-transitory computer readable medium storing one or more sequences of instructions for causing a system to populate a plurality of data structures of a software application written in a programming language, each of said plurality of data structures containing corresponding fields, wherein execution of said one or more sequences of instructions by one or more processors contained in said system causes said system to perform the actions of:

receiving an input data, said input data being according to eXtensible Markup Language (XML), wherein said input data contains a plurality of elements, each element having an associated value;

receiving a non-XML based schema, said non-XML based schema containing a plurality of schema structures according to said programming language of said software application, said plurality of schema structures specifying a mapping of each of said plurality of elements to respective fields of said plurality of data structures; and setting each of the fields of said plurality of data structures to values associated with an element specified by said mapping, wherein said plurality of data structures contains a first data structure with a first field, wherein said plurality of schema structures contains a first schema structure and a second schema structure, said first schema structure contains a mapping of a first tag text to said first data structure, said second schema structure contains a mapping of a second tag text to said first field, said first schema structure containing a link to said second schema structure to indicate that elements having said second tag text are disposed within elements having said first tag text, wherein said setting comprises:

parsing said plurality of elements to identify a hierarchical element having said first tag text and a sub-element at a lower level, said sub-element being disposed within said hierarchical element and having said second tag text, said sub-element having a first value; and storing said first value in said first field of said first data structure, in response to said identifying.

7. The non-transitory computer readable medium of claim 6, wherein each of said plurality of schema structures contains a type field indicating data type of the field into which the corresponding value is to be stored, wherein said type field in said first schema structure indicates that there is no value to be stored corresponding to the first schema structure, wherein said type field in said second schema structure indicates a first data type of said first field, wherein said parsing identifies a text between a start tag and an end tag, both of said start tag and said end tag containing said second tag text, wherein said storing further comprising converting said text into said first value of said first data type specified by said second schema structure.

8. The non-transitory computer readable medium of claim 6, wherein a third schema structure of said plurality of schema structures specifies a mapping of a first attribute text of an element in said plurality of elements to a second field in a second data structure of said plurality of data structures, wherein said parsing identifies a third value associated with said first attribute text in said element of said input data, wherein said storing stores said third value in said second field of said second data structure.

9. The non-transitory computer readable medium of claim 8, wherein said third schema structure is pointed to by a fourth schema structure of said plurality of schema structures, said fourth schema structure corresponding to said element.

10. The non-transitory computer readable medium of claim 6, wherein said first schema structure specifies a number of sub-elements in said hierarchical element, said first schema structure containing a number of links equaling said number of sub-elements, each link pointing to a corresponding one of a third set of schema structures of said plurality of schema structures, said third set of schema structures corresponding to sub-elements contained in said hierarchical element.

11. A digital processing system comprising:

a processor;

a random access memory (RAM);

a non-transitory computer readable medium that stores one or more sequences of instructions to cause the system to populate a plurality of data structures of a software application written in a programming language, wherein each of said plurality of data structures contains corresponding fields, and the one or more sequences of instructions which when retrieved into said RAM and executed by said processor cause said system to:

receive an input data, wherein said input data is according to eXtensible Markup Language (XML), wherein said input data contains a plurality of elements, and wherein each element has an associated value;

receive a non-XML based schema, wherein said non-XML based schema contains a plurality of schema structures according to said programming language of said software application, wherein said plurality of schema structures specify a mapping of each of said plurality of elements to respective fields of said plurality of data structures; and set each of the fields of said plurality of data structures to values associated with an element specified by said mapping, wherein said plurality of data structures contains a first data structure with a first field, wherein said plurality of schema structures contains a first schema structure and a second schema structure, said first schema structure contains a mapping of a first tag text to said first data structure, said second schema structure contains a mapping of a second tag text to said first field, said first schema structure contains a link to said second schema structure to indicate that elements that have said second tag text are disposed within elements that have said first tag text, wherein to set each of the fields of said plurality of data structures to values associated with an element specified by said mapping, the system is further operable to:

parse said plurality of elements to identify a hierarchical element that has said first tag text and a sub-element at a lower level, said sub-element is disposed within said hierarchical element and has said second tag text, said sub-element has a first value; and store said first value in said first field of said first data structure, in response to said identify.

12. The digital processing system of claim 11, wherein each of said plurality of schema structures contains a type field that indicates data type of the field into which the corresponding value is to be stored, wherein said type field in said first schema structure indicates that there is no value to be stored corresponding to the first schema structure, wherein said type field in said second schema structure indicates a first data type of said first field, wherein said parse identifies a text between a start tag and an end tag, wherein both of said start tag and said end tag contain said second tag text, wherein said store is further operable to convert said text into said first value of said first data type specified by said second schema structure.

13. The digital processing system of claim 11, wherein a third schema structure of said plurality of schema structures specifies a mapping of a first attribute text of an element in said plurality of elements to a second field in a second data structure of said plurality of data structures, wherein said parse identifies a third value associated with said first attribute text in said element of said input data, wherein said store stores said third value in said second field of said second data structure.

14. The digital processing system of claim 13, wherein said third schema structure is pointed to by a fourth schema structure of said plurality of schema structures, wherein said fourth schema structure corresponds to said element.

15. The digital processing system of claim 11, wherein said first schema structure specifies a number of sub-elements in said hierarchical element, said first schema structure contains a number of links equaling said number of sub-elements, each link points to a corresponding one of a third set of schema structures of said plurality of schema structures, said third set of schema structures correspond to sub-elements contained in said hierarchical element.

* * * * *